United States Patent Office 3,730,830
Patented May 1, 1973

3,730,830
PROCESS FOR MAKING PAPER
William T. Driscoll, Rochester, N.Y., assignor to
Eastman Kodak Company, Rochester, N.Y.
No Drawing. Filed Nov. 24, 1971, Ser. No. 202,013
Int. Cl. D21h 5/12
U.S. Cl. 162—146                                12 Claims

ABSTRACT OF THE DISCLOSURE

Paper particularly useful as photographic paper base is made by preparing a slurry in water of a mixture of a synthetic polymer staple fiber, such as a linear polyester, carboxymethyl cellulose and an inorganic pigment such as titanium dioxide or clay or carbon, blending the slurry with cellulose fiber before or after refining the cellulose fiber and forming a sheet of paper from the blend. The inorganic pigment tends to prevent agglomeration of the polymer fibers and allows a polymer slurry of relatively high consistency to be prepared for blending with the cellulose fibers.

---

The invention relates to a process for making paper containing synthetic polymer fibers as well as cellulose fibers.

Paper containing synthetic polymer fibers has been prepared by numerous methods which have in common the problem of uniformly dispersing the polymer fibers among the cellulose fibers in the paper stock supplied to the paper-making machine. It has been proposed, for example in U.S. Pats. 3,116,199 and 3,402,231, to disperse polymers in a slurry by means of carboxymethyl cellulose. The slurry may then be blended with other natural or synthetic fibers. However, it has been found that even when carboxymethyl cellulose is employed to aid in the dispersion of the polymer fibers, the consistency or concentration of the fibers must be kept relatively low to prevent agglomeration and to obtain a uniform dispersion. This makes the handling of the paper stock difficult and costly. In particular, since large amounts of water must be drawn off the formed sheet, the manufacturing cost tends to be prohibitive.

It has now been discovered that if an inorganic pigment or carbon is added to the slurry containing carboxymethyl cellulose and the synthetic polymer fibers, a consistency of the order of 3% can be employed to obtain a uniform dispersion which can be blended satisfactorily with cellulose fibers for forming a paper sheet as usual. It is possible by this process to make very thin papers having good formations containing about 10 to 25% synthetic fiber and about 1.5 mil thick. It is not understood how the pigment or carbon functions except that the agglomeration of the polymers in the paper furnish is substantially reduced. By using the synthetic polymers in the process of the invention it is possible, for example, to make papers weighing about 3 to 20 lbs./1,000 sq. ft. having the desired dry and wet strengths usually only obtainable in pure cellulose papers of about 30 lbs./1,000 sq. ft. containing conventional sizing materials.

In the process of the invention, the polymer fiber can be blended with the cellulose fiber either before or after refining the cellulose fiber. The latter is preferred since the polymer fiber may be adversely affected by beating, hydrating or cutting operations customarily employed in refining cellulose fiber to control fiber length and drainage rate. Thus, in a preferred process a slurry of the polymer fiber, carboxymethyl cellulose and the pigment in water is prepared and cellulose fiber which has been refined in known manner is blended therewith in the desired proportion.

The carboxymethyl cellulose used in the process is well known in the art and contains about 0.4 to 0.8 carboxyl unit per anhydroglucose unit. The carboxymethyl cellulose can be used in the form of the free acid, alkali metal or ammonium salts. Useful results are obtained using about 1 to 20%, preferably about 4 to 6%, by weight of carboxymethyl cellulose based on the amount of polymer fiber present.

The inorganic pigments used in preparing the paper furnish are particulate materials, preferably those which are photographically inert, i.e. having no adverse effect upon silver halide emulsions coated upon the paper. These pigments include light-colored pigments such as titanium oxide (both rutile and anatase forms), zinc sulfide, barium sulfate, calcium carbonate, etc. In those cases where non-photographic use of the paper is intended, zinc oxide, lead oxide, etc. can be used effectively to facilitate dispersion of the polymer fibers in the slurry. Clays are very useful alone or with the above pigments especially titanium oxide. Either water or solvent dispersible types of clays may be used, e.g. primary or secondary silicates such as hydrated aluminum silicates or calcined aluminum silicates. The amount of pigment or carbon used with the carboxymethyl cellulose in dispersing the polymer can be varied. Sufficient pigment or carbon is used to prevent agglomeration of the polymer fiber in the slurry, e.g. about 15 to 25% by weight of pigment based on the amount of synthetic polymer present. The proportion of polymer fiber to cellulose fiber can be varied depending upon the feel, wet and dry strengths desired in the paper. For example, 10 to 25% polymer fiber is useful. Representative papers are prepared containing about 2 to 5% retained titanium oxide and about 20% linear polyester, the carboxymethyl cellulose largely washing out of the paper when sheeting out the paper on the Fourdrinier as usual.

A wide variety of synthetic polymer staple fibers can be used, preferably those which are water repellant, for example, the well-known textile fibers comprising polyamides such as the nylons, viscose, acrylic polymers, modacrylic polymers, polyolefins, e.g. polyethylenes, polypropylenes and ethylene-propylene copolymers, acrylonitrile copolymers, cellulose organic acid esters, e.g. cellulose acetate, linear aromatic polyesters, e.g. polyethylene terephthalates sold under various trademarks such as "Kodel," "Dacron" and "Terylene." These polyester fibers are described in detail in U.S. Pats. 2,901,446, 2,465,319, 2,945,010, 2,957,745 and 2,989,363. The linear polyesters usually have melting points of at least 200° C. Useful acrylic polymer textile fibers containing acrylonitrile units are described in U.S. Pats. 2,990,393 (Re. 25,533) and 3,014,008 (Re. 25,539) or modified with vinyl-pyrrolidone, acrylic ester or acrylamide units as in U.S. Pats. 2,879,253, 2,879,254 and 2,838,470. Modacrylic polymers useful are described in U.S. Pat. 2,831,-826 comprising vinylidene chloride or vinyl chloride, acrylonitrile, acrylamidic and vinyl pyridine units. The polymer fibers can vary in size, e.g. 0.75 to 10, preferably 1.5 to 3 denier being useful in making the paper. Fiber lengths of about 3/16 to one inch can be used as desired. The invention is especially useful with low denier polymer fibers which tend to agglomerate more.

The cellulose fibers well known in the art are used as obtained from hard or softwood pulps. The fiber is defibered and refined in a well-known manner to control fiber length and drainage of the formed sheet.

The synthetic polymer fiber, cellulose fiber, carboxymethyl cellulose and pigment comprise the essential components of the paper furnish. However, known wet strength agents and sizing materials can be added to obtain the optimum or desired physical properties in the paper. The retention of pigment such as titanium oxide in the paper can be increased, if desired, by addition of retention agents such as polyamides to the paper furnish. It is usually desirable to control the acidity of the paper furnish. This can be effected by acidifying the slurry of polymer fiber, carboxymethyl cellulose and pigment before blending with the refined cellulose fiber.

The papers prepared by the process of the invention are especially useful as photographic paper bases. For example, they can be coated with one or more layers of gelatin-silver halide emulsion. Very thin papers prepared by the process of the invention are suitable for emulsion coating and provide sensitive papers having good dry and wet strengths in the various processing photographic solutions used. Photo-recording papers advantageously contain a thin paper base made by the process of the invention.

The following examples will serve to illustrate the process of the invention.

EXAMPLE 1

Part A

To 300 gallons of 30 to 70° F. water (if desirable, adjusted to pH 2.0 to 3.0 with sulfuric acid) is added 28.5 lbs. of polyethylene terephthalate fiber 1.5 to 3.0 denier and about ¼ inch long. To this is added with stirring 5.7 lbs. of rutile, medium oil dispersible titanium dioxide and 0.57 lb. carboxymethyl cellulose averaging 0.6 carboxyl units per anhydroglucose unit. After thorough mixing, additional 30 to 70° F. water may be added to a convenient volume to facilitate flow.

Part B

An 80/20 mixture of bleached softwood and bleached hardwood kraft pulps is defibered in a hydropulper and refined at 3% consistency to a 40 to 50 seconds Williams slowness and pumped to a holding chest.

Part A is further diluted 50/50 with water (60 to 110° F.) while being pumped to the paper machine head tank where it is mixed with Part B, the refined cellulose. The flow rates of the two fiber systems are controlled to give the desired ratio of cellulose to synthetic fiber to obtain about 10 to 25% synthetic fiber in the sheet. The paper is formed, dried and calendered to the desired thickness, e.g. about 1.5 mil. Paper weights of about 3 to 30 lbs. or more per 1,000 sq. ft. are obtainable and the paper may contain about 2 to 5% of pigment such as titanium oxide, the carboxymethyl cellulose largely washing out of the sheet. The paper has good wet and dry strength. The excellent formation of the paper indicates that the synthetic polymer has been uniformly dispersed in the paper furnish.

EXAMPLE 2

The process of Example 1 is carried out except using 5.7 lbs. of a hydrated aluminum silicate clay instead of titanium dioxide. A paper of quality comparable to that obtained with titanium oxide is obtained.

EXAMPLE 3

The process of Example 1 is repeated except using a similar amount of cellulose acetate fiber (substantially fully esterified) in place of the polyester with comparable results. A sheet of good formation wet and dry strength is obtained.

The other pigments, carbon and synthetic polymers, especially acrylic, modacrylic and acrylonitrile polymer fibers mentioned above, are used in the process in the manner of Example 1. Variations in temperature of the dryers of the paper machine can be expected to vary the properties of the paper. Polymer fibers of different melting points will provide paper of different feel, dry and wet strength using the same or different temperatures in the dryers.

The invention has been described in detail with particular reference to preferred embodiments thereof, but it will be understood that variations and modifications can be effected within the spirit and scope of the invention.

I claim:

1. A process for making paper comprising preparing an aqueous slurry of a mixture of a synthetic polymer staple fiber, carboxymethyl cellulose and an inorganic pigment or carbon, blending the slurry with cellulose fiber, either before or after refining the cellulose fiber and forming a sheet of paper from the blended fibers on a paper-making machine, said blended slurry containing about 1–20% by weight of said carboxymethyl cellulose based upon the amount of synthetic fibers present in such slurry, said sheet containing 10–25% by weight of polymer staple fiber, said blended slurry also containing an amount of said inorganic pigment or carbon sufficient to prevent agglomeration of said polymer fibers.

2. The process according to claim 1 wherein the slurry is blended with refined cellulose fiber.

3. The process according to claim 1 wherein the polymer fiber is a linear polyester.

4. The process according to claim 3 wherein the inorganic pigment is titanium dioxide, clay or a mixture thereof.

5. The process according to claim 1 wherein the polymer fiber is a polyamide and a photographically inert inorganic pigment is present in the slurry.

6. The process according to claim 1 wherein the polymer fiber is an acrylonitrile polymer.

7. The process according to claim 1 wherein the polymer fiber is an acrylic or modacrylic polymer.

8. The process according to claim 1 wherein the polymer fiber is a cellulose organic acid ester.

9. The process according to claim 1 wherein the slurry is made acidic before blending with the cellulose fiber.

10. The process according to claim 1 wherein the carboxymethyl cellulose contains about 0.4 to 0.8 carboxyl groups per anhydroglucose unit.

11. The process according to claim 1 wherein the polymer fibers have a denier of about 0.75 to 10 and fiber lengths of about 3/16 to one inch.

12. The process according to claim 1 wherein said inorganic pigment or carbon is present in the amount between 15–25% of said blended slurry by weight.

References Cited

UNITED STATES PATENTS

| | | | |
|---|---|---|---|
| 3,653,894 | 4/1972 | Levy et al. | 162—138 |
| 3,486,889 | 12/1969 | Bobalek et al. | 162—157 C |
| 2,943,013 | 6/1960 | Arledter | 162—181 B |
| 2,626,214 | 1/1953 | Osborne | 162—177 |

S. LEON BASHORE, Primary Examiner

P. CHIN, Assistant Examiner

U.S. Cl. X.R.

96—85; 162—157 C, 157 R, 177, 181 B, 181 D, 181 R